United States Patent [19]
Greathead

[11] 3,866,740
[45] Feb. 18, 1975

[54] METHOD OF FEEDING DISCRETE ARTICLES FROM A STORAGE LOCATION AND A MACHINE THEREFOR

[75] Inventor: Thomas William Greathead, Billericay, England

[73] Assignee: The Post Office, London, England

[22] Filed: July 5, 1972

[21] Appl. No.: 269,209

[30] Foreign Application Priority Data
July 6, 1971 Great Britain.................. 31756/71

[52] U.S. Cl. ............................................... 198/34
[51] Int. Cl. ........................................... B65g 47/26
[58] Field of Search ................................ 198/34, 19

[56] References Cited
UNITED STATES PATENTS

| | | | |
|---|---|---|---|
| 2,794,534 | 6/1957 | Forrester ............................ | 198/34 |
| 3,251,452 | 5/1966 | Conway .............................. | 198/34 |
| 3,353,652 | 11/1967 | Fellner................................ | 198/34 |
| 3,651,921 | 3/1972 | Hill ..................................... | 198/34 |
| 3,700,090 | 10/1972 | Pearson .............................. | 198/34 |

FOREIGN PATENTS OR APPLICATIONS
1,034,055 12/1964 Great Britain....................... 198/34

*Primary Examiner*—Evon C. Blunk
*Assistant Examiner*—Jeffrey V. Nase
*Attorney, Agent, or Firm*—Kemon, Palmer & Estabrook

[57] ABSTRACT

The invention is applicable to a flow-line processing plant in which articles are processed in two distinct operations which are performed by two operators working at independent rates and is particularly applicable to the sorting of postal parcels in which one operator faces the parcels and a second operator reads the addresses thereon and keys their destination, in coded form, into a sorting machine. An arrangement of conveyors enables the articles to be stored in a storage location between the first and second operators, the articles being fed seriatim from the storage location to the second operator under the control of control means at the second operators working station. The conveyor arrangement comprises two conveyors with interjacent barrier means and moving means operable, under the control of the control means, alternately to permit and prevent transfer of the articles from one conveyor to the other. The conveyors can be arranged to separate one article from the others at the storage location, means being provided to sense said separation and signal the control means to permit the transfer of that one article alone. The term conveyor is not limited to belt conveyors but may include chutes or other gravity fed devices.

4 Claims, 4 Drawing Figures

METHOD OF FEEDING DISCRETE ARTICLES FROM A STORAGE LOCATION AND A MACHINE THEREFOR

The invention relates to a system for and a method of feeding discrete articles from a first work station to a second work station and particularly concerns a postal parcel sorting apparatus and method.

In postal sorting and coding systems for parcels a first operator has to face the parcel, i.e. to place each parcel in such a position that a second operator can read the address thereon, and the second operator has to operate a keyboard that codes the address into a machine-readable code and stores it in a pinwheel controller to be read by a sorting machine. The coded parcel is then processed by the machine which acts on the code and conveys the parcel to a predetermined outlet or storage location for a particular coded destination.

As two operators are involved in the direct flow line of the system it is desirable for the smooth operation of the system that both operators should have the same rate of working. This is virtually unachievable in practice and usually the second operator works at a slower rate than the first operator owing to the difficulty of reading some addresses and because some parcels will automatically, by chance, arrive at the first operator at the correctly faced position and so require no facing operation. It is therefore desirable that a short term buffer store be created between the first and second operators. The creation of such a store will enable the second operator always to have a parcel waiting to be coded, and the first operator will be able to work at a rate that is not continuously related to the rate of working of the second operator.

One problem that arises with a buffer store between the first and second operators is that although economy of storage space and simplicity of design requires such a store to be arranged so that adjacent parcels are in contact, the second operator requires the parcels to be fed to him seriatim and the diversity in the dimensions of the parcels make it difficult to arrange for a barrier to be interposed between adjacent parcels in the store so that their despatch can be discretely controlled.

It is an object of the invention to provide means whereby this problem may be overcome.

According to a first aspect of the invention we provide a system for feeding discrete articles from a first work station to a second work station comprising a first conveying means for feeding the articles from the first work station to a storage location, second conveying means for feeding the articles from the storage location to the second work station, transfer means at the storage location for transferring the articles from the first conveying means to the second conveying means, and control means for controlling the transfer means to be selectively operative and inoperative so that the rate of feed of articles to the second work station is not continuously related to the rate of feed of articles from the first work station.

The system may be operated by driving the first conveying means to carry the articles, at a first rate, away from the first work station after processing thereat and urge the articles into a line ending at the end of the first conveying means, operating the control means to render the transfer means operative and simultaneously driving the second conveying means to carry an article at the end of the line away from the end of the first conveying means at a rate greater than first said rate to cause said article to be longitudinally separated from the line, and sequentially sensing said separation and rendering the transfer means inoperative.

The transfer means may comprise a barrier and moving means for effecting relative movement between the barrier and the first conveying means, the moving means being operable under the control of the control means to cause the barrier to be interposed between the first and the second conveying means for a period of time determined by the control means, whereby the transfer means is rendered inoperative during said period.

In the preferred form, the transfer means comprises a barrier fixed relative to the start of the second conveying means and moving means for effecting relative movement between the barrier and the end of the first conveying means and the transfer means is arranged so that, when it is operative, the barrier and the end of the first conveying means are in a first relative position in which the barrier extends not higher than the end of the first conveying means and, when the transfer means is inoperative, the barrier and the end of the first conveying means are in a second relative position in which the barrier extends above the end of the first conveying means, the moving means being operable under the control of the control means to move one of the barrier and the end of the first conveying means relative to the other between said first and second relative positions.

Throughout this specification the terms "start" and "end" as used in relation to the conveying means are intended to refer respectively to the points at which the articles are loaded on to and unloaded from the conveying means. Thus the first conveying means has its start at the first work station and its end at the storage location and the second conveying means has its start at the storage location and its end at the second work station, and although the first conveying means and/or the second conveying means may comprise a continuous belt, each will have a start and end as aforementioned.

The invention also provides transfer means for the aforedescribed system comprising a barrier and moving means operable under the control of the control means to effect relative movement of one of the barrier and the end of the first conveying means between a first relative position in which the barrier is not above the level of the end of the first conveying means and a second relative position in which it is interposed between adjacent ends of the first and the second conveying means so as to prevent the transfer of articles therebetween.

The transfer means may comprise a roller located between the barrier and the second conveying means, above the level of the barrier and below the level of the second conveying means, the roller being driven while the transfer means is operable so as to sustain the transfer of articles from the first conveying means to the second conveying means. In a particularly convenient form, the first conveying means comprises a belt conveyor driven to urge articles placed thereon towards the start of the second conveying means, the belt of the first conveying means having a relatively low coefficient of friction and the roller having a relatively high coefficient of friction. By this means the roller may effectively pull the articles in turn from the end of the first conveying means.

In applications such as the sorting of postal parcels, it is generally required that the articles be fed seriatim to the second work station and thus the transfer means may be adapted to effect longitudinal separation of the articles one from another, the control means including sensing means for sensing the separation and being adapted to render the transfer means inoperative when said separation has been sensed so that the articles are transferred seriatim from the end of the first conveying means to the start of the second conveying means. This may be done by providing drive means for driving the first and the second conveying means at different speeds such that articles carried by the second conveying means are conveyed at a rate greater than the rate at which articles are conveyed by the first conveying means, whereby said longitudinal separation is effected.

The sensing means may comprise a beam of light extending transversely across the path of the articles on the first conveying means and a photo-electric sensor arranged to detect the light beam when the articles are longitudinally separated and send a signal to the transfer means to render the transfer means inoperative.

The first conveying means and/or the second conveying means may be inclined to the horizontal in a direction along or normal to the direction of motion of articles carried thereby.

As mentioned hereinbefore, the system may be applied to postal parcel sorting apparatus wherein the first work station is a parcel facing station and the second work station is a parcel coding station. In this case there may be provided, at the parcel coding station, keying means for associating a machine-readable address with each parcel seriatim, the keying means being connected to the control means so that the transfer means is rendered inoperative while an address is being keyed.

The invention also provides a method of sorting postal parcels comprising feeding the parcels from a facing location to a buffer store and feeding the parcels seriatim from the buffer store to a coding location under the control of an operator at the coding location, the rate of feed of the parcels to the coding location being independent of the rate of feed of the parcels from the facing location.

The parcels may be fed seriatim from the coding location to a sorting machine, and a parcel coder may be provided at the coding location, the parcel coder being keyed to associate a machine-readable address with each parcel seriatim, the address being stored until the parcel arrives at the sorting machine. The arrival of parcels at and the dispatch of parcels from the coding location is preferably initiated by the act of keying the parcel coder.

According to a further aspect of the invention there is provided a method of feeding discrete articles seriatim to a second work station from a first work station wherein the articles are fed from the first work station to a storage location by first conveying means and from the storage location to the second work station by second conveying means, said method comprising interposing a barrier between the first and second conveying means under the control of an operator at the second work station and in accordance with the time required to process each article thereat.

According to a yet further aspect of the invention there is provided apparatus for taking discrete articles of irregular shape and size seriatim from an end of a line of said articles arranged in contact, said apparatus comprising first conveying means for receiving the articles and urging them towards its end so as to form a line of the articles ending at the end of the first conveying means, second conveying means for conveying the articles away from the end of the first conveying means, the end of the first conveying means being adjacent the start of the second conveying means, a barrier interjacent the end of the first conveying means and the start of the second conveying means and fixed relative to the start of the second conveying means, drive means for driving the second conveying means, positioning means for varying the relative position of the barrier and the end of the first conveying means so that in one relative position the end of the first conveying means is substantially level with the start of the second conveying means and above the barrier and in another relative position the end of the first conveying means is below the top of the barrier and the start of the second conveying mans, and control means for controlling the drive means and the positioning means so that, the barrier and the end of the first conveying means are in said one relative position, the drive means is operative and, when the barrier and the end of the first conveying means are in the other relative position, the drive means is inoperative.

The present invention as applied to the sorting of postal parcels will now be described by way of example, with reference to the accompanying diagrammatic drawings which:

Figure 1:
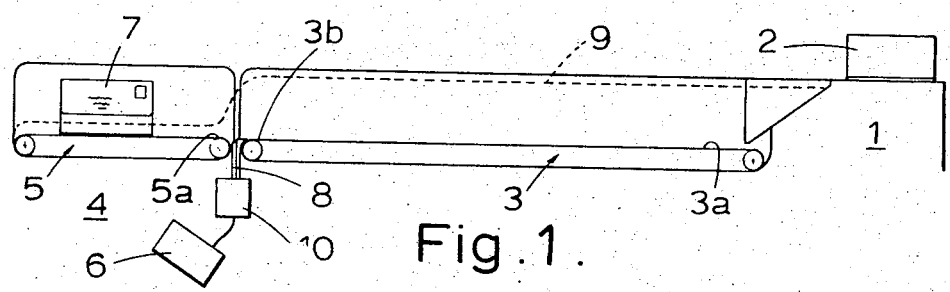
FIG. 1 shows a postal parcel facing and coding conveyor system.

Referring now to FIG. 1, the system comprises a first work station at a parcel facing location 1, at which an operator faces a parcel 2 and loads it on to the start 3a of a first, inclined conveyor 3 which conveys the parcel towards its end 3b. Adjacent the end 3b of the first conveyor 3 is the start 5a of a second conveyor 5 which is arranged to convey parcels seriatim to a second work station at a coding location 4 as will be described hereinafter.

An operator at the coding location 4 controls the motion of the second conveyor 5 by way of control means 6. The address on a parcel 7 at the coding location 4 is read by the coding operator who keys a keyboard on the control means 6 so that the address is coded, stored and associated with the parcel 7 by a coding machine (not shown). The code associated with the parcel enables the destination of the parcel to be read by a parcel sorting machine (not shown).

Interjacent the end 3b and the start 5a of the conveyor 3 and 5 is a barrier 8 which is controlled in height relative to the end 3b of the conveyor 3 but is fixed in height relative to the start 5a of the conveyor 5 so that in a first position the barrier lies below the levels of the end 3b and start 5a whereas in a second position the barrier lies below the level of the start 5a but above the level of the end 3b. When the barrier 8 is above the level of the end 3b any parcels loaded on to the conveyor 3 by the facing operator at the facing location 1 will be arrested by the barrier 8 and will accumulate in line and in contact on the conveyor 3. The surface of the conveyor 3 is arranged to have a relatively low coefficient of friction so that it may slide relative to the parcels when they are arrested by the barrier 8. In this manner a line of parcels will be accumulated on the conveyor 3 to provide a buffer store for parcels between the facing operator at the facing location 1 and the coding operator at the coding location 4.

Parcels are removed from the end 3b of the conveyor 3 one at a time under the control of the operator at the coding location 4. This is achieved by raising, by moving means 10 the level of the end 3b relative to the barrier and the start 5a so that the parcel at the end of the line of parcels at the conveyor 3 is no longer abutting the barrier 8 and is accordingly fed forward by the motion of the conveyor 3 so that it is transferred from the end 3b to the start 5a. The parcels are prevented from falling off the conveyors during their carriage thereon by means of a side plate 9 (shown by a broken line), the height of which is reduced at the junction between the conveyors 3 and 5 so that the coding operator has a substantially unobstructed view of parcels at the coding location.

The means for transferring parcels from the end 3b to the start 5a will now be described with reference to FIGS. 2, 3 awnd 4 wherein, where possible, the reference numerals introduced on FIG. 1 have been retained.

Figure 2:
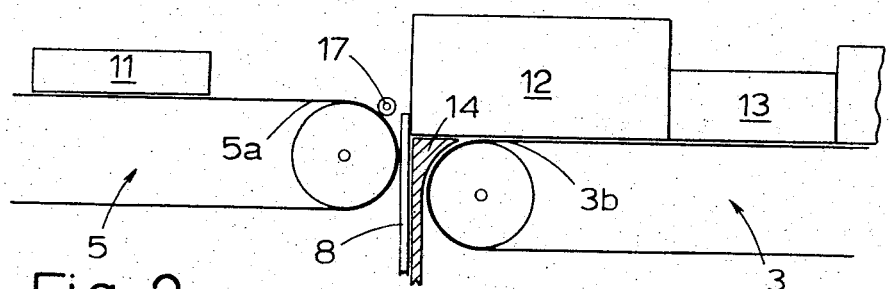
FIG. 2 shows the first of three steps in a method of conveying the parcels seriatim to a coding location from a facing location.

FIG. 2 shows a parcel 11 at the coding location on the conveyor 5 and two parcels 12 and 13 stored in line and in contact on the conveyor 3. As shown, the parcel 12 is abutting the barrier 8 so that its motion towards the conveyor 5 is arrested. The conveyor 3 is driven so that parcels loaded thereon are urged towards its end 3b. The conveyor 3 may be a smooth steel band conveyor with a low coefficient of friction so that it slides relatively freely under the parcels when they are arrested by the barrier 8. A stationary section 14 (shown shaded) of the conveyor 3 is fixed relative to the end 3b thereof and slides relative to the barrier 8. The section 14 serves to prevent parcels from wedging between the end 3b and the barrier 8.

In the position shown in FIG. 2 the conveyor 3 is driven at a substantially constant speed and the conveyor 5 is stationary until coding operator has read the address on the parcel 11 and keyed a coder which associates the coded address with the parcel so that the parcel may be sorted by a parcel sorting machine which reads the coded address. When the coding operator has keyed the coder the conveyor 5 is driven so as to transport the parcel 11 towards a further conveyor (not shown) which feeds the coded parcels to the parcel sorting machine. The operation of keying the coder also initiates a sequence of events illustrated in FIGS. 3 and 4.

Figure 3:
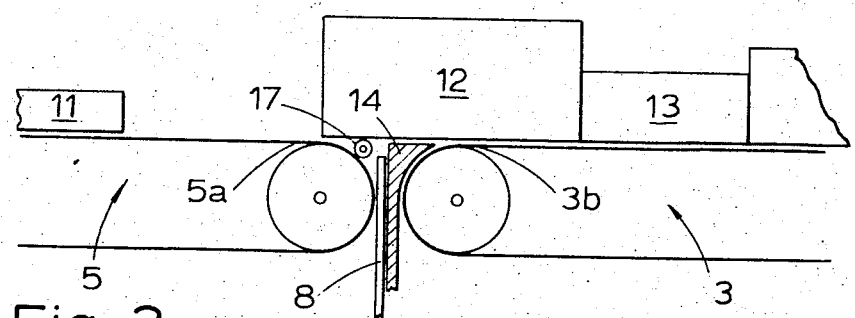
FIG. 3 shows the second step in the method.
Figure 4:
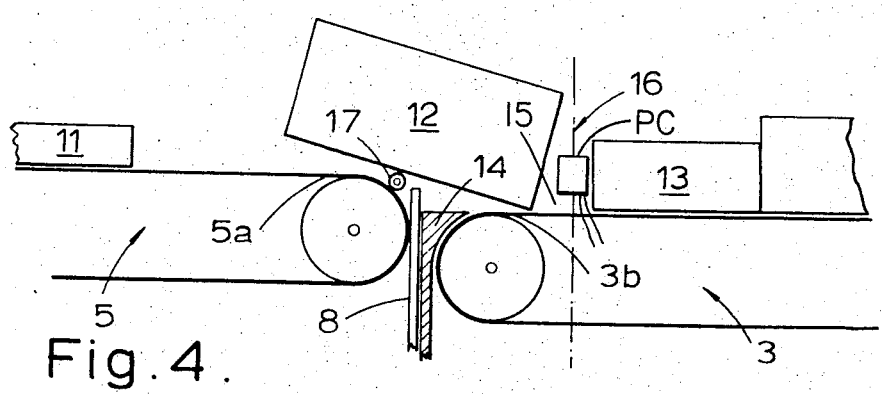
FIG. 4 shows the third step in the method.

As shown in FIG. 3 the level of the end 3b and the section 14 is raised relative to the top of the barrier 8 so that the parcel 12 is driven forwards over the top of the barrier 8 until its leading edge contacts the start 5a of the conveyor 5 and as the conveyor 5 is driven the parcel 12 will accordingly be drawn on to the conveyor 5. The time required to transport the parcel 12 from its stored position at the end 3b to the point when its leading edge first contacts the start 5a can be calculated from the knowledge of the rate at which the conveyor 3 is driven and thereafter the end 3b may be returned to its lower level relative to the start 5a. In one embodiment of the invention the end 3b and the start 5a are retained in the aligned position for 50 ms which is sufficient for the parcel 12 to be transported across the gap between the end 3b and the start 5a. If necessary, to assist in the transfer of parcels from the end 3b to the start 5a a small, high friction roller 17 may be interposed between the barrier 8 and the start 5a so that a parcel in the position illustrated by the parcel 12 in FIG. 4 is contacted by the roller 17 which is driven at a higher speed than the conveyor 5 and thus urges the parcel on to the start 5a and also prevents parcels from fouling the top of the barrier 8.

In an alternative, preferred form, however, the conveyors 3 and 5 are arranged to effect longitudinal separation between the parcel 12 and the parcel 13, as will now be described in more detail, and this separation is sensed by sensing means which control the relative position of the end 3b and the start 5a. As hereinbefore described, the conveyor 3 is arranged so that it may slide relative to parcels stored thereon and arrested by the barrier 8. In this prefered form the conveyor 5 is a belt conveyor having a relatively high coefficient of friction and being driven at a rate such that parcels carried thereby are carried faster than those carried on the conveyor 3. Thus when the leading edge of the parcel 12 contacts the start 5a it will be drawn away from the parcel 13 to form a gap, indicated at 15 in FIG. 4, between the parcels 12 and 13. A beam of light is directed, generally in a plane indicated at 16, across the path of parcels carried on the conveyor 3. A photoelectric cell is positioned alongside the conveyor 3 to detect the beam and it will be apparent that the photoelectric cell will detect the beam only when there is a gap such as 15 between adjacent parcels at the end 3b of the conveyor 3.

The output of the photo-electric cell is arranged to control positioning means (not shown) which determine the relative position of the end 3b and the start 5a so that the end 3b is returned to its lower level only after a gap between parcels has been detected. By this means the period during which the end 3b is horizontally aligned with the start 5a is effectively determined by the longitudinal dimension of the parcel being transferred therebetween and thus parcels will be transferred seriatim irrespective of variatons in their lengths.

It will be appreciated that, after the end 3b has been returned to its lower level, the parcel 13 which follows the parcel 12 will not be transferred from the end 3b to the start 5a until these are again horizontally aligned, which is effected by the keying of the coder by the coding operator.

When a parcel has been transferred to the conveyor 5 it is carried thereby to the coding location and the conveyor 5 is then stopped until the address on the parcel has been read and keyed into the coder.

The conveyors 3 and 5 may be inclined to the horizontal in the direction of motion of parcels carried thereby and may also be inclined in a direction normal thereto so that the parcels are gravitationally urged against a side plate such as is indicated at 9 in FIG. 1 to cause the parcels aligned. The conveyors may be driven or may comprise a gravity fed chute.

It will be appreciated that the parcel coding operator may work at a rate independent of that of the parcel facing operator. If, as is usual, the facing operator works at a fasterrate than the coding operator the conveyor 3 acts as a buffer store for parcels between the two operators. The aforementioned use of photoelectric sensing means enables the coding operator to work at a faster rate than the facing operator since the end 3b and the start 5a of the conveyors 3 and 5 are retained in their horizontally aligned relative position until the light beam is interupted by the passage of the next parcel from the facing operator, thus enabling the coding operator to receive the first parcel from the facing operator without any keying action of the coder.

In the case of a postal parcel sorting system the height of the barrier 8 must be sufficient to arrest any parcel reaching the end 3b of the conveyor 3, regardless of dimensional variations, and yet the barrier must be sufficiently low to prevent parcels from fouling the barrier when they are being transferred. If necessary, the end 3b may be raised slightly above the start 5a for a predetermined period when the first parcel is being transferred. Nevertheless, it will be apparent that the invention is applicable to other applications in which articles are required to be fed seriatim to a second work station from a first work station, and, where such articles are of uniform size and shape the dimensions of the apparatus and the relative positions of the conveyors 3 and 5 may advantageously be adjusted to optimum values.

Modifications to the system described will be apparent to those skilled in the art and the above example is intended to illustrate the principle of the invention and not to limit any of its applications.

I claim:

1. A system for feeding discrete articles of diverse shape and size from a first work station to a second work station at which the articles are processed sequentially in an operation which takes a randomly variable time; said system comprising first conveying means for conveying the articles along a path from the first work station to a storage location; second conveying means for conveying the articles from the storage location to the second work station, each of said first conveying means and said second conveying means having a start and an end with the end of the first conveying means being adjacent to the storage location; a barrier interjacent the end of the first conveying means and the start of the second conveying means, means for moving the end of the first conveying means, transversely of said path, relative to the barrier between a first relative position in which the barrier is clear of said path and transfer of an article from the first conveying means to the second conveying means is permitted and a second relative position in which the barrier blocks said path and said transfer is prevented; intermediate conveying means located between the barrier and the start of the second conveying means above the level of the barrier to be engageable with each article during transfer thereof and arranged to be driven at a rate sufficient to convey the article being transferred towards the start of the second conveying means faster than the first conveying means conveys articles thereon towards the storage location thereby to effect separation between the article being transferred and other articles on the first conveying means; and control means for controlling the relative position of the barrier and the end of the first conveying means, said control means being operable at the second work station to cause the barrier and the end of the first conveying means to assume their first relative position and sensing means arranged to sense said separation and cause the barrier and the end of the first conveying means to assume their second relative position whereby the articles are transferred seriatim.

2. A system according to claim 1 wherein the intermediate conveying means comprises a roller and the first conveying means comprises a belt conveyor driveable to urge articles thereon towards the storage location.

3. A system according to claim 2 wherein said roller has a greater co-efficient of friction, relative to said articles, than the belt of the first conveying means.

4. A system according to claim 1 wherein said sensing means comprises a beam of light extending transversely across said path to be interrupted by articles conveyed there along by the first conveying means and a photoelectric sensor arranged to detect said beam during said separation.

* * * * *